United States Patent

Hodson

Patent Number: 5,852,649
Date of Patent: Dec. 22, 1998

[54] ALARM NOTIFICATION SYSTEM AND METHOD FOR A TELEPHONE SWITCH

[75] Inventor: Jeffrey D. Hodson, Wheaton, Ill.

[73] Assignee: Rockwell International Corp., Seal Beach, Calif.

[21] Appl. No.: 606,357

[22] Filed: Feb. 23, 1996

[51] Int. Cl.[6] .................................................. H04M 1/24
[52] U.S. Cl. .................. 379/9; 379/10; 379/15; 379/34
[58] Field of Search .................... 379/9–10, 13, 379/15, 27, 29, 34

[56] References Cited

U.S. PATENT DOCUMENTS

| | | | |
|---|---|---|---|
| 5,384,823 | 1/1995 | Brenski et al. | 379/10 |
| 5,426,688 | 6/1995 | Anand | 379/10 |
| 5,457,729 | 10/1995 | Hamann et al. | 379/34 |
| 5,475,732 | 12/1995 | Pester, III | 379/34 |
| 5,546,450 | 8/1996 | Suthard et al. | 379/9 |
| 5,579,371 | 11/1996 | Aridas et al. | 379/34 |
| 5,592,530 | 1/1997 | Brockman et al. | 379/10 |

Primary Examiner—Curtis A. Kuntz
Assistant Examiner—Duc Nguyen
Attorney, Agent, or Firm—Welsh & Katz, Ltd.

[57] ABSTRACT

An alarm notification system 100 and method for automatically reporting an alarm condition related to a telephonic switch 102 to a remote communications device, such as a display unit 104 or a paging unit 106, is provided. The system 100 may communicate with the display unit 104 and/or the paging unit 106 through a modem 115 and a network 114. Alternatively, a paging circuit 128 may provide cellular communications with the paging unit 106 and/or the display unit 104. An alarm sensing circuit 116 senses an alarm condition. Alarm conditions are defined and modified by an alarm setting circuit 118. After an alarm condition is sensed, an alarm notification circuit detects and logs various alarm information relating to the sensed alarm condition. The alarm notification circuit automatically transmits the alarm information to the remote communications device. The alarm notification circuit may comprise an alarm date circuit 120 for detecting a date on which the alarm condition occurs, an alarm time circuit 122 for detecting a time at which the alarm condition occurs, an alarm severity circuit 124 for assigning a severity classification to the alarm condition and an alarm description circuit 126 for indicating a type of the alarm condition.

20 Claims, 2 Drawing Sheets

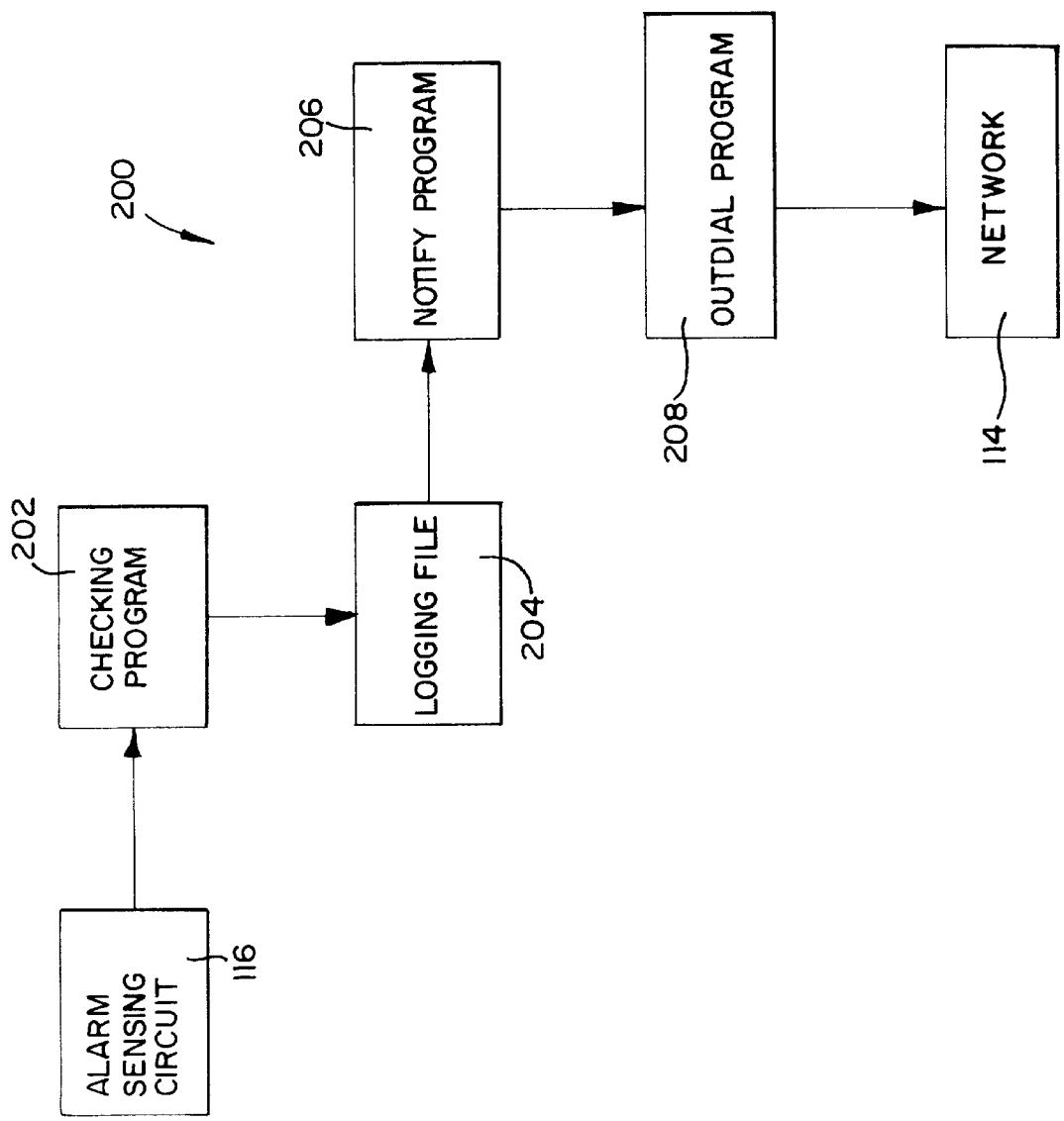

ALARM NOTIFICATION SYSTEM AND METHOD FOR A TELEPHONE SWITCH

BACKGROUND OF THE INVENTION

The present invention relates generally to a diagnostic system for detecting and reporting faults in the operation of a telephonic switch and, more particularly, to a method and alarm notification system for automatically detecting and reporting alarm conditions in a telephonic switch which automatically transmits alarm information relating to the alarm conditions to a remote communications device.

Telephonic switches are increasingly being used by businesses to automatically route incoming customer calls to available agents. One common type of telephonic switch is an automatic call distributor (ACD) which generally includes a multiport switch controlled by a central processing unit to interconnect external telephonic units of an external telephonic network with internal telephonic units. An example of such an ACD is disclosed in U.S. Pat. No. 5,140,611 issued to Jones et al. on Aug. 18, 1992, entitled "Pulse Width Modulated Self-Clocking and Self-Synchronizing Data Transmission and Method for a Telephonic Communication Network Switching System", the disclosure of which is hereby incorporated by reference.

One advantageous feature of many telephonic switches is the ability to detect faults and to alert maintenance personnel in a timely manner. Many diagnostic programs permit maintenance personnel to access the programs from remote locations. The maintenance personnel typically dial a designated telephone number (which may be by telephone or modem) and provide an access number to gain access to the programs.

Unfortunately, these prior systems require that the maintenance personnel manually access the diagnostic programs by dialing in and the like. Maintenance personnel may access the diagnostic program a significant time after a fault first occurred. During this time delay, an initially nonserious fault may have grown into a more serious fault.

Thus, a need exists for a method and alarm notification system which automatically reports alarm conditions to one or more remote communications devices.

SUMMARY OF THE INVENTION

This need is met by an alarm notification system and method in accordance with the present invention which automatically senses an alarm condition related to a telephonic switch, which automatically detects and logs alarm information relating to the alarm condition and which automatically transmits the alarm information to a remote communications device.

In accordance with one aspect of the present invention, a method for automatically reporting an alarm condition related to a telephonic switch to a remote communications device is provided. The method comprises the steps of detecting the alarm condition, detecting alarm information relating to the alarm condition and automatically transmitting the alarm information relating to the remote communications device.

The step of detecting alarm information preferably comprises the steps, in any combination or singularly, of: detecting a date on which the alarm condition occurs; detecting a time at which the alarm condition occurs; assigning a severity classification to the alarm condition; and detecting a type of the alarm condition. The step of transmitting the alarm information may comprise the steps of: detecting switch information relating to the telephonic switch; and automatically transmitting the switch information with the alarm information to the remote communications device. The switch information may comprise a site code identifying the telephonic switch and/or a size of the telephonic switch.

In accordance with another aspect of the present invention, an alarm notification system automatically reports an alarm condition related to a telephonic switch to a remote communications device. The alarm notification system comprises an alarm sensing circuit for sensing the alarm condition and an alarm notification circuit for transmitting alarm information relating to the alarm condition to the remote communications device in response to the alarm sensing circuit. The alarm notification system may comprise an alarm setting circuit for selecting the alarm condition.

In accordance with yet another aspect of the present invention, a method for automatically reporting an alarm condition related to a telephonic switch to a remote communications device is provided. The method comprises the steps of: detecting the alarm condition; detecting alarm information relating to the alarm condition, the alarm information comprising a date on which the alarm condition occurs and a time at which the alarm condition occurs; and automatically transmitting the alarm information to the remote communications device. The method may comprise the steps of detecting switch information relating to the telephonic switch; and automatically transmitting the switch information with the alarm information to the remote communications device.

These and other features and advantages of the present invention will become apparent from the following detailed description, the accompanying drawings and the appended claims.

BRIEF DESCRIPTION OF THE DRAWINGS

FIG. 2 is a block diagram showing exemplary software programs implemented in the alarm notification system shown in FIG. 1 in accordance with the present invention.

DETAILED DESCRIPTION OF THE INVENTION

Figure 1:
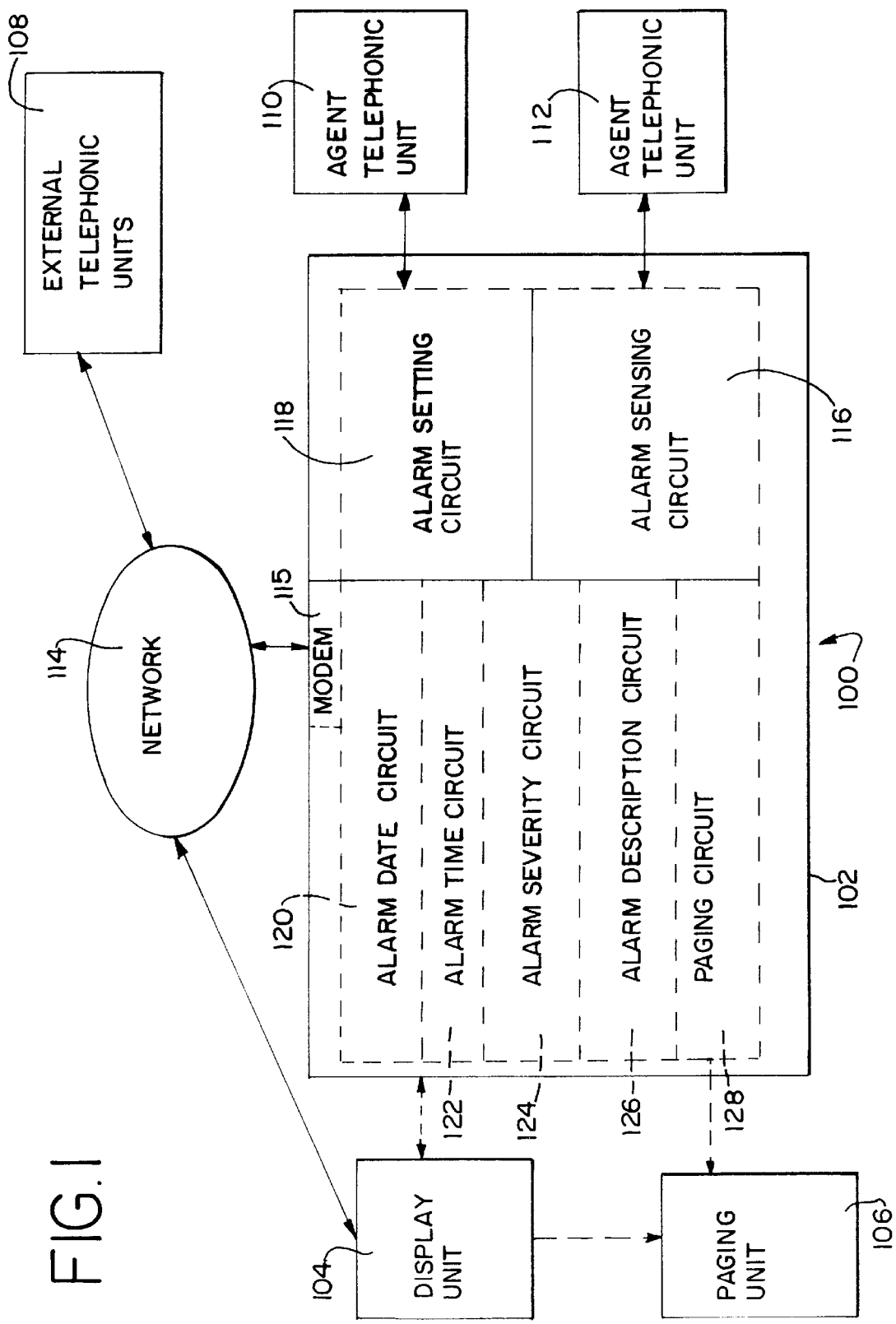
FIG. 1 is block diagram showing an alarm notification system in accordance with the present invention.

An alarm notification system 100 in accordance with the present invention for automatically reporting an alarm condition related to a telephonic switch 102 to a remote communications device is shown in FIG. 1. The remote communications device may be a display unit 104 or a paging unit 106. The telephonic switch 102 may be any of a number of electronic switches which route incoming telephone calls from external telephonic units 108 to agent telephonic units 110 and 112. Although many types of telephonic switches may be advantageously employed in the present invention, one such type is disclosed in U.S. Pat. No. 5,140,611 issued to Jones et al. on Aug. 18, 1992, entitled "Pulse Width Modulated Self-Clocking and Self-Synchronizing Data Transmission and Method for a Telephonic Communication Network Switching System", the disclosure of which was previously incorporated by reference. The incoming telephone calls are transmitted from the external telephonic units 108 to the telephonic switch 102 over a telephone network 114.

An alarm notification system automatically reports alarm conditions to the remote display unit 104 and/or the paging unit 106 on a substantially real-time basis through a conventional modem 115. The alarm notification system includes an alarm sensing circuit 116 for sensing when an alarm condition, or fault condition, occurs related to the telephonic switch 102. As those skilled in the art will readily comprehend, the alarm condition may be associated with hardware of the system 100, such as cooling fans, fuses and circuit breakers and the like, equipment, such as circuit cards, and network interfaces, such as a T1 facility. An alarm setting circuit 118 selects and permits modification of which events are to be considered an alarm condition.

An alarm notification circuit automatically transmits alarm information relating to the alarm conditions to the display unit 104 and/or the paging unit 106 to inform the appropriate maintenance personnel. The alarm notification circuit may additionally transmit switch information relating to the telephonic switch 102 to the remote communications device. For example, the switch information may be comprised of a site code which uniquely identifies the telephonic switch 102 and/or a size (number of ports) of the telephonic switch 102.

The alarm notification circuit comprises numerous software based circuits which detect the alarm information. For example, an alarm date circuit 120 detects a date on which the alarm condition occurs. An alarm time circuit 122 detects a time at which the alarm condition occurs. An alarm severity circuit 124 may assign a severity classification to the alarm condition. For example, the alarm severity circuit 124 may assign severity classifications of "critical"—system-wide service disruption requiring immediate corrective action, "major"—disruption of an important system capability requiring immediate corrective action and "minor"—requiring corrective action, although not necessarily immediate action.

An alarm description circuit 126 detects a type of the alarm condition which further defines the problem causing the alarm condition. A paging circuit 128 may transmit the alarm information and the switch information to the paging unit 106. As those skilled in the art will readily realize, the signal from the paging unit 106 will typically be sent through a network of cellular transmitter/receivers before reaching the paging unit 106. For clarity, such cellular transmitter/receivers are not shown in FIG. 1. Alternatively, the paging unit 106 may receive the alarm information from the display unit 104.

A block diagram 200 representing various exemplary software programs implemented in the present invention is shown in FIG. 2. The alarm sensing circuit 116 senses an alarm condition. A checking program 202 periodically, such as for example every 15 seconds, checks for a signal from the alarm sensing circuit 116 indicating that an alarm condition has been detected. If the checking program 202 detects an alarm condition, alarm information relating to the detected alarm condition is logged into a logging file 204. The alarm information may be obtained from various sources, such as the circuits discussed above. The alarm information which has been logged is then tagged so that the checking program 202 is able to distinguish it from new alarm conditions detected thereafter.

A notify program 206 periodically, such as for example every 20 seconds, checks the logging file 204 for new alarm conditions. If new alarm conditions are detected, an outdial program 208 outdials the display unit 104 or the paging unit 106 over the network 114 in any of a number of well known methods. The proper dialing sequence executed by the outdial program 208 may be previously entered by an operator.

Having thus described the invention in detail by way of reference to preferred embodiments thereof, it will be apparent that other modifications and variations are possible without departing from the scope of the invention defined in the appended claims. Therefore, the spirit and scope of the appended claims should not be limited to the description of the preferred versions contained herein.

What is claimed is:

1. A method for automatically reporting an alarm condition related to a telephonic switch for routing telephone calls from external telephone units to agent telephone units to a remote communications device, the method comprising the steps of:

detecting the alarm condition;

detecting alarm information relating to the alarm condition, including detecting switch information relating to the telephonic switch, including a size of the telephonic switch; and automatically transmitting the alarm information to the remote communications device.

2. The method as recited in claim 1 wherein the step of detecting alarm information comprises the step of detecting a date on which the alarm condition occurs.

3. The method as recited in claim 1 wherein the step of detecting alarm information comprises the step of detecting a time at which the alarm condition occurs.

4. The method as recited in claim 1 wherein the step of detecting alarm information comprises the step of assigning a severity classification to the alarm condition.

5. The method as recited in claim 1 wherein the step of detecting alarm information comprises the step of detecting a type of the alarm condition.

6. The method as recited in claim 1 wherein the step of detecting switch information comprises the step of:

detecting a site code identifying the telephonic switch.

7. The method as recited in claim 1 wherein the step of automatically transmitting comprises the step of accessing a display unit over a telephonic network.

8. The method as recited in claim 1 wherein the step of automatically transmitting the alarm information comprises the step of transmitting the alarm information to a paging unit.

9. An alarm notification system for automatically reporting an alarm condition related to a telephonic switch for routing telephone calls from external telephone units to agent telephone units to a remote communications device comprising:

a sensing circuit for sensing the alarm condition and switch information relating to the telephonic switch, including a size of the telephonic switch; and an alarm notification circuit for transmitting alarm information relating to the alarm condition and switch information relating to the telephonic switch to the remote communications device in response to the alarm sensing circuit.

10. The alarm notification system as recited in claim 9 comprising an alarm setting circuit for selecting the alarm condition.

11. The alarm notification system as recited in claim 9 wherein the alarm notification circuit comprises a modem for transmitting the alarm information.

12. The alarm notification system as recited in claim 9 wherein the alarm notification circuit comprises an alarm time circuit for detecting a time at which the alarm condition occurs, the time being included in the alarm information.

13. The alarm notification system as recited in claim 9 wherein the alarm notification circuit comprises an alarm date circuit for detecting a date in which the alarm condition occurs, the date being included in the alarm information.

14. The alarm notification system as recited in claim 9 wherein the alarm notification circuit comprises an alarm severity circuit for assigning a severity classification to the alarm condition, the severity classification being included in the alarm information.

15. The alarm notification system as recited in claim 9 wherein the alarm notification circuit comprises an alarm description circuit for detecting a type of the alarm condition, the type being included in the alarm information.

16. The alarm notification system as recited in claim 9 wherein the alarm notification circuit comprises a paging circuit for transmitting the alarm information to a paging unit.

17. A method for automatically reporting an alarm condition related to a telephonic switch for routing telephone calls from external telephone units to agent telephone units to a remote communications device, the method comprising the steps of:

detecting the alarm condition;

detecting alarm information relating to the alarm condition, the alarm information comprising a date on which the alarm condition occurs and a time at which the alarm condition occurs;

detecting switch information relating to the telephonic switch, and a size of the telephonic switch; and automatically transmitting the alarm information and the switch information to the remote communications device.

18. A method for automatically reporting a fault in a telephonic switch to a remote communications device, the method comprising the steps of:

detecting the fault in the telephonic switch;

detecting fault information relating to the fault in the telephonic switch;

detecting switch information relating to the telephonic switch, including information relating a size of the telephonic switch; and automatically transmitting the fault information and the switch information to the remote communications device.

19. The method of claim 18, wherein the fault in the telephonic switch comprises a hardware fault.

20. The method of claim 18, wherein the fault in the telephonic switch comprises a circuit card fault.

\* \* \* \* \*